United States Patent
Ito

(10) Patent No.: US 7,615,202 B2
(45) Date of Patent: Nov. 10, 2009

(54) METHOD FOR PRODUCING HIGH PURITY SILICON

(75) Inventor: Nobuaki Ito, Chiba (JP)

(73) Assignee: Nippon Steel Materials Co., Ltd., Tokyo (JP)

( * ) Notice: Subject to any disclaimer, the term of this patent is extended or adjusted under 35 U.S.C. 154(b) by 0 days.

(21) Appl. No.: 11/885,750

(22) PCT Filed: Feb. 28, 2006

(86) PCT No.: PCT/JP2006/304187

§ 371 (c)(1),
(2), (4) Date: May 9, 2008

(87) PCT Pub. No.: WO2006/095662

PCT Pub. Date: Sep. 14, 2006

(65) Prior Publication Data

US 2008/0241045 A1 Oct. 2, 2008

(30) Foreign Application Priority Data

Mar. 7, 2005 (JP) ............................. 2005-062559
Feb. 10, 2006 (JP) ............................. 2006-034360

(51) Int. Cl.
*C01B 33/02* (2006.01)
*C01B 33/037* (2006.01)

(52) U.S. Cl. ...................... 423/349; 423/348
(58) Field of Classification Search ......... 423/348–350; 75/10.46, 10.47, 10.5–10.54, 10.57
See application file for complete search history.

(56) References Cited

U.S. PATENT DOCUMENTS

| 4,241,037 A | 12/1980 | Pelosini et al. |
| 4,388,286 A * | 6/1983 | Kapur et al. ................. 423/348 |
| 5,182,091 A | 1/1993 | Yuge et al. |
| 5,510,095 A | 4/1996 | Aratani et al. |
| 5,820,842 A | 10/1998 | Smith et al. |
| 5,972,107 A | 10/1999 | Schmid et al. |
| 2005/0139148 A1 | 6/2005 | Fujiwara et al. |
| 2007/0180949 A1 | 8/2007 | Kondo et al. |

FOREIGN PATENT DOCUMENTS

| JP | 60-106943 A | 6/1985 |
| JP | 4-130009 A | 5/1992 |
| JP | 04-193706 A | 7/1992 |
| JP | 4-228414 A | 8/1992 |
| JP | 05-246706 A | 9/1993 |
| JP | 09-202611 A | 8/1997 |

(Continued)

*Primary Examiner*—Roy King
*Assistant Examiner*—Brian Walck
(74) *Attorney, Agent, or Firm*—Birch, Stewart, Kolasch & Birch, LLP

(57) ABSTRACT

An object of the invention is to provide a method for producing a large amount of inexpensive high purity silicon useful for a solar battery. Disclosed is a method for producing high purity silicon by migrating impurities in silicon to slag including performing a first slag purification of a first silicon, separating the slag from the first silicon after finishing the first slag purification, and feeding the separated slag to a second molten silicon in a second purification of the second silicon, wherein purity of said second silicon prior to purification is lower than purity of the first silicon after purification.

3 Claims, 3 Drawing Sheets

FOREIGN PATENT DOCUMENTS

| | | |
|---|---|---|
| JP | 11-049510 A | 2/1999 |
| JP | 2000-302432 A | 10/2000 |
| JP | 2003-277040 A | 10/2003 |
| JP | 2005-247623 A | 9/2005 |
| SU | 865 951 A | 9/1981 |
| WO | WO 8902415 A1 * | 3/1989 |
| WO | WO-03/066523 A1 | 8/2003 |
| WO | WO-2005/085134 A1 | 9/2005 |

* cited by examiner

METHOD FOR PRODUCING HIGH PURITY SILICON

This application claims priority to Japanese patent application No. 2005-062559, filed in Japan on Mar. 7, 2005, and Japanese patent application No. 2006-034360, filed in Japan on Feb. 10, 2006, the entire contents of which are herein incorporated by reference.

BACKGROUND OF THE INVENTION

1. Field of the Invention

The present invention relates to a method for producing high-purity silicon. The high-purity silicon is used for a solar battery.

2. Description of the Related Art

As for silicon to be used for a solar battery, the purity has to be 99.9999 mass % or more, each of the metallic impurities in the silicon is required to be not more than 0.1 mass ppm. Especially, the impurity of boron (B) is required to be not more than 0.3 mass ppm. Although silicon made by the Siemens Process, which is used for a semiconductor, can meet the above requirements, the silicon is not suitable for a solar battery. This is due to the fact that the manufacturing cost of silicon by the Siemens Process is high while a solar battery is required to be inexpensive.

Several methods have been presented in order to produce high-purity silicon at a low cost.

The process of unidirectional solidification of silicon metal has been well known for a long time. In such a process, molten silicon metal is unidirectionally solidified to form a more purified solid phase silicon utilizing the difference in solubility of impurities between solid phase and liquid phase. Such a process can be effectively used for purifying silicon from a variety of metallic impurities. However, this method cannot be used for purifying silicon from boron because the difference in solubility of boron between solid phase and liquid phase is too small to purify silicon from boron.

The process of vacuum melting silicon is also well known. This process removes low boiling point impurities from silicon by holding molten silicon in a vacuum state and is effective to remove carbon impurities from silicon. However, this method cannot be applied to purifying silicon from boron because boron in molten silicon does not normally form a low boiling point substance.

As mentioned above, boron has been thought to be a problematic component because boron in silicon is the most difficult impurity to removed from and yet greatly affects the electrical property of silicon. Methods for which the main purpose is to remove boron from silicon are disclosed as follows.

JP56-32319A discloses a method for cleaning silicon by acid, a vacuum melting process for silicon and a unidirectional solidification process for silicon. Additionally, this reference discloses a purification method using slag for removing boron, where the impurities migrate from the silicon to the slag, which is placed on the molten silicon. In the patent reference JP56-32319A, the partition ratio of boron (concentration of boron in slag/concentration of boron in silicon) is 1.357 and the obtained concentration of boron in the purified silicon is 8 mass ppm by using slag including ($CaF_2$+CaO+$SiO_2$). However, the concentration of boron in the purified silicon does not satisfy the requirement of silicon used for solar batteries.

JP58-130114A discloses a slag purification method, where a mixture of ground crude silicon and slag containing alkaline-earth metal oxides and/or alkali metal oxides are melted together. However, the minimum boron concentration of the obtained silicon is 1 mass ppm, which is not suitable for a solar battery. In addition, it is inevitable that new impurities are added when the silicon is ground, which also makes this method inapplicable to solar batteries.

Non-patent reference, "Shigen to Sozai" (Resource and Material) 2002, vol. 118, p. 497-505, discloses another example of slag purification where the slag includes ($Na_2O$+CaO+$SiO_2$) and the maximum partition ratio of boron is 3.5. The partition ratio 3.5 is the highest value disclosed in the past, however, this slag purification is still inapplicable to solar batteries considering the fact that the boron concentration in the practically available raw material of slag.

As mentioned above, conventional slag purification methods, which fail to obtain a practically available high partition ratio of boron, are not suitable for obtaining silicon useful in a solar battery. The reason why the partition ratio of boron, when purifying silicon from boron, tends to be low is that silicon is oxidized as easily as boron. In slag purification methods, boron in silicon tends to be non-oxidized and the non-oxidized boron is hardly absorbed in the slag. The slag purification method is widely used for removing boron from steel because boron is far more easily oxidized than steel. Because of the essential difference in properties between steel and silicon, the slag purification technique in steel industry cannot simply be applied to removing boron from silicon.

Methods combining conventional slag purification and other methods are presented.

JP2003-12317A discloses another purification method. In this method, fluxes such as CaO, $CaO_3$ and $Na_2O$ are added to silicon and they are mixed and melted. Then, blowing oxidizing gas into the molten silicon results in purification. However, silicon purified by this method has a boron concentration of about 7.6 mass ppm, which is not suitable for use in a solar battery. Furthermore, it is difficult, from an engineering point of view, to blow stably oxidizing gas into molten silicon at low cost. Therefore, the method disclosed in JP2003-12317A is not suitable for the purification of silicon.

U.S. Pat. No. 5,972,107 and U.S. Pat. No. 6,368,403 disclose methods for purifying silicon from boron where a special torch is used and water vapor and $SiO_2$ are supplied in addition to oxygen and hydrogen and CaO, BaO and/or $CaF_2$ to molten silicon.

The technologies in U.S. Pat. No. 5,972,107 and U.S. Pat. No. 6,368,403, requiring not only expensive equipments such as a special torch but also a complicated operation, are difficult to implement from an industrial point of view.

The conventional technologies mentioned above can be classified into two categories. The first category includes methods where slag only is supplied onto molten silicon (disclosed in JP56-32319A and JP58-130114A, hereinafter referred to as "simple slag purification method"). The second category includes methods where oxidizing gas is contacted with the molten silicon and slag and/or raw materials of slag such as $SiO_2$ are supplied onto molten silicon (disclosed in JP2003-12317A, U.S. Pat. No. 5,972,107 and U.S. Pat. No. 6,368,403, hereinafter referred to as "complex slag purification method").

A feature of the "simple slag purification method" is that the partition rate of boron is about 3 or less (normally about 1). Therefore, firstly, in conventional use, the target boron concentration is normally set at 1 mass ppm or more. This is due to the fact that it is inevitable for the slag to contain boron in an amount of 1 mass ppm or more due to the raw materials used for slag. As long as the partition rate of boron is around 1, it is theoretically difficult to obtain silicon having a boron concentration that is much lower than the boron concentration of the slag no matter how much the slag is used. Although it is theoretically possible to reduce the boron concentration by purifying the raw slag materials, it is not industrially feasible due to being economically unreasonable. Secondly, the purification is attempted at one time using a great amount of slag. The amount of slag may be one to several times the amount of molten silicon. This is because the boron concentration of silicon metal is at best 10 mass ppm and the targeted concentration of boron is about 1 mass ppm. Therefore, if the partition rate is around 2, and five times the amount of slag compared to molten silicon is used, silicon with the targeted boron concentration can be obtained in a single purification.

In a "complex slag purification method", the slag used is granular and the amount of slag added is relatively very small compared to the amount of molten silicon. The removal of boron is performed mainly through vaporization by oxidizing gas. Supplementary used slag does not make so much of an impression that no report of partition rate data of boron remains. Also, the raw slag materials are fed in the form of powder. Therefore, once the materials are turned to slag, they must be discarded after completing the purification process.

SUMMARY OF THE INVENTION

An object of the present invention is to provide a method of producing high purity silicon simply at low cost by purifying crude silicon from impurities, particularly boron, to a level useful for solar batteries.

Specifically, use of conventional slag purification fundamentally requires a great amount of slag relative to the amount of silicon and a great amount of slag is discarded. Thus, the cost for raw slag materials and the cost of processing the waste slag raise manufacturing costs. Thus, an object of the present invention is to provide a technology to lower the amount of slag used, lower the amount of slag formed, and thereby lower the total manufacturing cost of purified silicon.

The present inventors have designed the following solutions after studying silicon production.

One embodiment is a method for producing high purity silicon by migrating impurities in silicon to slag comprising: performing a first slag purification of a first molten silicon, separating the slag from the silicon after finishing the first slag purification, and feeding the separated slag to a second molten silicon in a purification of said second silicon, wherein the purity of the second silicon is lower than the purity of the first silicon. More specifically, the purity of the second silicon prior to purification is lower than the purity of the first silicon after the first slag purification.

In another embodiment, the above steps further comprise feeding an oxidizing agent to the second molten silicon.

In yet another embodiment, the feeding of the oxidizing agent is conducted so that the oxidizing agent directly contacts the molten silicon.

In another embodiment, the slag separation is conducted so that the separated slag includes a part of the first molten silicon.

In another embodiment, the oxidizing agent is a material comprising as a primary component at least one of the following materials: alkali metal carbonate, hydrate of alkali metal carbonate, alkali metal hydroxide, alkaline-earth metal carbonate, hydrate of alkaline-earth metal carbonate or alkaline-earth metal hydroxide.

The present invention can drastically reduce the total amount of slag used for slag purification of silicon. Further, the combined use of the present invention and a conventional unidirectional solidification process or a conventional vacuum melting process can supply silicon useful as a raw material for a solar battery with high quality and low cost.

PREFERRED EMBODIMENTS OF THE INVENTION

Figure 1:
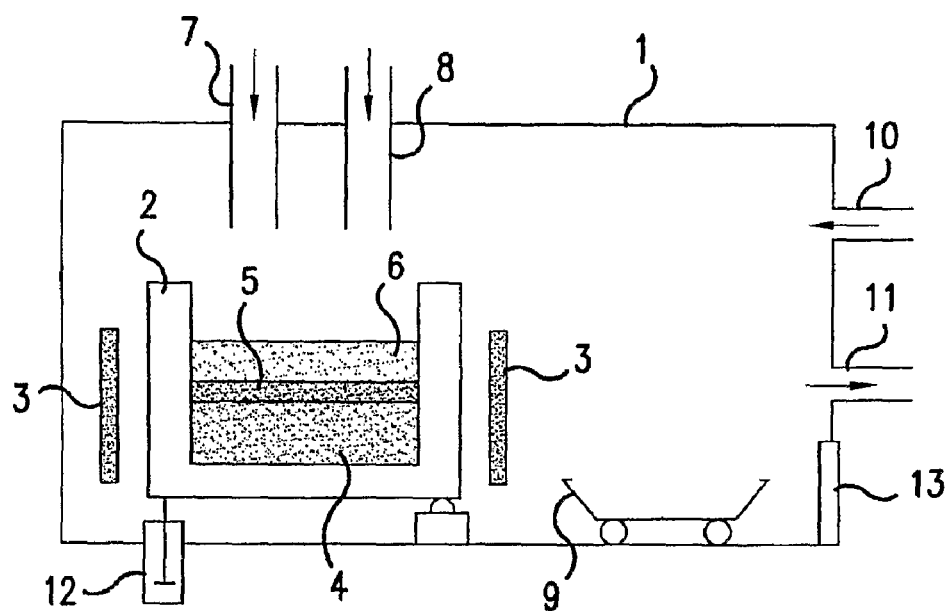
FIG. 1 is a schematic diagram showing an apparatus used for the method of the present invention.

The present invention differs from conventional technologies concerning the following points. There has previously been no indication that slag, once used, should be reused for another purification. This is due to the fact that the partition rate of boron was low. Even if the slag reuse was carried out, it could not have previously been expected to be a reasonable method for manufacturing. However, in the present invention, slag purification with a high partition rate of boron is presented and a new method where slag, which has already been used once, can be reused with high efficiency by utilizing a high partition rate of boron.

Advantages of the present invention are described below.

As mentioned above, in conventional slag purification, the partition rate of boron is normally about 1. Therefore, when high purity slag with a boron concentration of 1 mass ppm is used, a majority of the cases use molten silicon with a boron concentration that is higher than the boron concentration of the slag used for the purification. For example, if the purification is performed on the conditions that the partition rate of boron is 1, the amount of silicon equals to the amount of slag, the boron concentration of the silicon is 5 mass ppm, and the boron concentration of the slag is 1 mass ppm, then the resulting boron concentration of the silicon is 3 mass ppm and the resulting boron concentration of the slag is 3 mass ppm (i.e., 3 times the initial boron concentration of slag) assuming no contamination. If the slag, once used, is reused for purification of another silicon having a boron concentration of 5 mass ppm, the resulting boron concentration of the silicon is 4 mass ppm. This means that the removed amount of boron from the silicon is reduced by one-half relative to the amount removed in the first use. Thus, the reuse of slag has an adverse influence on silicon purification. In view of above, the reuse of slag is limited to lower purity silicon, such as silicon containing 10 mass ppm of boron. Even such limited reuse of slag can be advantageous in reducing raw material costs for slag and in reducing the costs of waste slag treatment. However, use of lower purity slag may increase the number of slag purifications, which may lower the productivity and increase cost of manufacturing. Conventional technologies try to avoid an increase in the number of purifications and one-time purification using a large amount of slag compared to silicon has been conducted.

In the process of developing the present invention, the present inventors have found that a high partition rate of boron such as 7 to 11 can be obtained when an oxidizing agent, such as sodium carbonate ($Na_2CO_3$) is fed with the slag so that the oxidizing agent directly contacts the molten silicon. Then, it is possible to utilize slag with about 1 mass ppm of boron and a high partition rate of boron to achieve a purification process which obtains silicon with 0.1 mass ppm of boron. Based on these new facts, the present invention can reduce the amount of slag used for slag purification without increasing the number of slag purifications by reusing slag which has been used once for a slag purification to obtain a high purity silicon containing boron in an amount on the order of 0.1 mass ppm.

The slag reuse of the present invention is described below. Since the partition rate of boron is high, high purity slag such as slag with 1 mass ppm of boron is often used for slag purification of molten silicon having a boron concentration lower than that of the slag. This is a great difference from the operation conditions of conventional technologies. For example, when purification is performed on the conditions that the partition rate of boron is 9, the amount of silicon equals the amount of slag, the boron concentration of the silicon is 0.3 mass ppm, and the boron concentration of the slag is 1 mass ppm, the resulting boron concentration of the silicon is 0.13 mass ppm and the resulting boron concentration of the slag is 1.17 mass ppm (i.e., 1.17 times the initial boron concentration of the slag) assuming no contamination. If the slag, once used, is reused for purification of another silicon having a boron concentration of 0.3 mass ppm, the resulting boron concentration of the silicon is 0.15 mass ppm. This means that the amount of boron removed from the silicon is reduced by about 12 mass % relative to the amount at first use. Thus, reuse of the slag does not have much of an adverse influence on the purification. This is because the boron content in the silicon before purification is much smaller than that in the slag. Therefore, even if all of the boron in the silicon migrates into the slag during purification, the percentage increase in the boron concentration of the slag is not large. Therefore, in the present invention, it is possible to drastically reduce or avoid an increase in the number of purifications required due to a lowering in the purity of the slag. Thus, the present invention is fundamentally advantageous relative to conventional technologies, which can be applied only to silicon having a boron concentration that is almost the same as that of the slag.

With respect to the expression "purity of the second silicon is lower than the purity of the first silicon", "purity of the first silicon" refers to the purity of the silicon after being subjected to the purification process. Further, "purity of the second silicon" refers to the purity of second silicon before being subjected to the purification process. For example, if silicon having a boron concentration of 0.3 mass ppm is purified using slag to form a purified silicon having a boron concentration of 0.13 mass ppm (the first silicon), and then the slag used (slag once used) is reused for purification of another silicon (the second silicon) having a boron concentration of 0.3 mass ppm, this falls under "purity of the second silicon is lower than the purity of the first silicon". Obviously the slag once used can be reused for purification of silicon with a higher concentration of boron (e.g., 1 mass ppm). When the slag is reused for the purification of silicon with a higher concentration of boron, there is a reduction in the influence of lowered slag purity on the removable amount of boron from the silicon. A slag can be reused repeatedly as long as the concentration of impurities in the slag are in the allowable range. Generally, the more times the slag is reused, the lower the purity of silicon for which the slag can be reused becomes.

An outline of the construction of an exemplary apparatus for slag purification according to the present invention is described below with reference to FIG. 1. A crucible 2, placed in a purification furnace 1, is heated by a heater 3. Molten silicon 4 is accommodated in the crucible 2 and kept at a certain temperature. An oxidizing agent 5 is fed through an oxidizing agent feeding tube 7 and slag 6 is fed through a slag feeding tube 8 onto the molten silicon 4 in the crucible 2. As for slag, both fresh slag and slag that has been used once before can be fed. A reaction and purification including boron removal is commenced between the molten silicon 4, the oxidizing agent 5 and the slag 6. During heating and purification, the atmosphere inside the furnace is controlled with respect to the kinds and concentrations of gas through a gas feeding line 10 and a gas exhaust line 11. When the oxidizing agent 5 is consumed (by reaction with the molten silicon 4 and the slag 6 or by vaporization) and boron migration to the slag 6 is almost completed, the slag and the oxidizing agent remaining on the molten silicon, as well as silicon inseparable therefrom (hereinafter these are referred to as "used material") are discharged from the crucible 2 by tilting the crucible 2, using a crucible tilting device 12, into a used slag receiver 9. The used slag receiver 9 is moved out of the furnace through a used slag exit 13. Then, the crucible 2 is set to its original position and if necessary new slag 6 and oxidizing agent 5 are again fed onto the molten silicon 4 and the purification process can be repeatedly performed.

Figure 2:
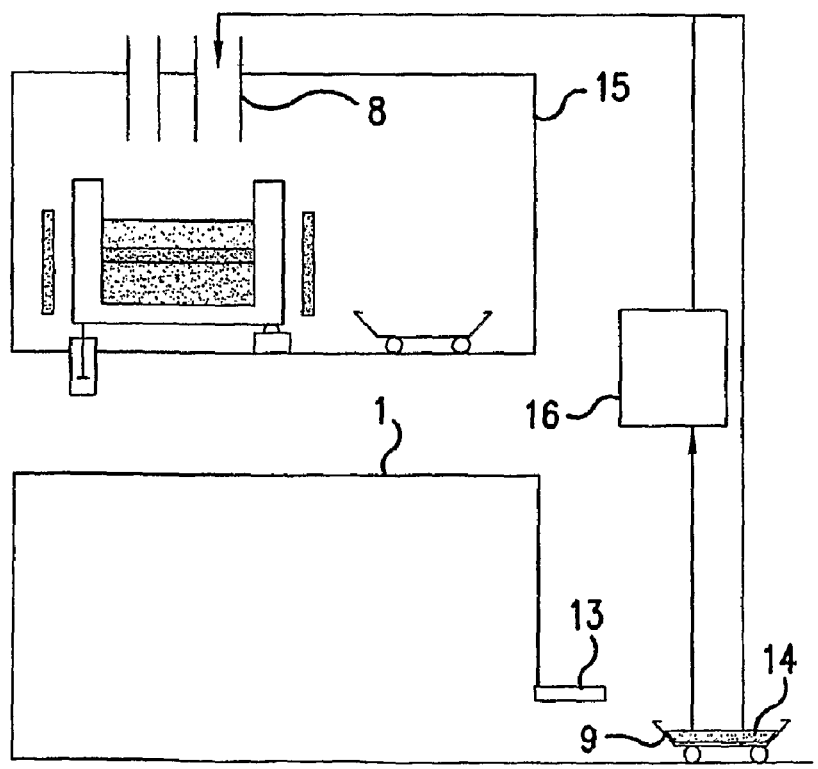
FIG. 2 is a schematic diagram illustrating the flow of the reuse of slag.

Slag reuse flow: The flow of slag reuse is described as follows with reference to FIG. 2. In the first purification furnace 1 shown in FIG. 2, the same operations as described above with respect to FIG. 1 are performed. After finishing purification, the used slag receiver 9, carrying used material 14 removed from the top of the molten silicon, is moved out of the first purification furnace. The second purification furnace 15, which has the same construction as the first purification furnace of FIG. 1, is prepared for silicon purification. The used material 14 is fed directly, or preferably fed after being processed in a used material processor 16, onto the molten silicon through a slag feeding tube 8 in the second purification furnace 15 to commence the purification of silicon. The operations in the second purification furnace 15 are the same as for the purification furnace 1 described for FIG. 1

Processing of Used Material: The used material 14 can be directly used as a reused slag if the temperature is high. If not, processing of the used material is preferably conducted. The processing of the used material can be any of the following processes or combinations thereof.

If the temperature of the used material is low, a heating furnace, such as an induction heating furnace, can be used for heating up the used material.

If the used material is solidified, the used material may be crushed using an appropriate crusher, such as a commercially available hammer.

If the oxidizing agent is firmly fixed to the used material, the oxidizing agent may be removed from the used material using a cutter, such as a commercially available diamond saw.

If the basicity of the used material (percentage of alkali metal component in the material) is not appropriate in terms of slag reactivity, the basicity may be adjusted appropriately by adding sodium carbonate or silica to the used material and blending.

The term "used slag" refers to material obtained after processing used material, or refers to used material which is directly usable without processing. When used slag is utilized, an oxidizing agent may be fed onto the molten silicon together with the used slag so as to restrain the lowering of slag purification efficiency. The feeding of an oxidizing agent together with the used slag is particularly effective if the slag contains ingredients having high oxidizing ability and/or highly volatile ingredients. In the case of using slag including sodium carbonate, sodium oxide generated in the slag may oxidize boron in the silicon. This increases the slag purification efficiency (purification efficiency can be, for example, evaluated by the partition rate of boron). That is, sodium carbonate (sodium oxide) functions as an oxidizing agent of boron. Sodium oxide, however, becomes generally highly volatile at the temperatures of slag purification and can be vaporized during purification. Therefore, the amount of sodium oxide in the slag decreases over time as the purification proceeds. This leads to a lowering of purification efficiency. Then, if the used slag is utilized directly for another slag purification, the purification efficiency may become so low that the boron in the slag may migrate to the silicon. In view of this, in case of reusing used slag, the used slag is preferably revitalized by supplying an oxidizing agent such as sodium oxide. It is found by the inventors of the present invention that supplying oxidizing agent each time the slag is reused can repeatedly revitalize the slag. In the case of using slag with a high oxidizing ability, the ingredient having high oxidizing ability is converted to a material with a lower oxidizing ability while oxidizing silicon during the purification process. Also in this case, the slag can be revitalized by adding oxidizing agent, which can avoid lowering the purification efficiency. Contrary to this, in the case of using slag with a low oxidizing ability and low volatility, lowering the purification efficiency during the purification process is not so significant that the slag can be reused directly for another purification without problems. In a conventional slag purification process, since known examples are limited to the cases where slag with low oxidizing ability and low volatility is used, the requirement for slag revitalization by supplying oxidizing agent has not drawn attention in the industry. In view of industrialization, however, the present inventors have realized that slag should be reused, and found that supplying oxidizing agent each time the slag is reused can revitalize slag.

Oxidizing Agents: As for oxidizing agents, any oxidizing agents can be used as long as they meet the conditions of oxidizing ability, purity, ease in handling and price. Preferably, however, the oxidizing agent is a material comprising as a primary component at least one of the following: alkali metal carbonate, hydrate of alkali metal carbonate, alkali metal hydroxide, alkaline-earth metal carbonate, hydrate of alkaline-earth metal carbonate or alkaline-earth metal hydroxide. There are several reasons why these materials are preferred. First, they have a large oxidizing ability. Second, they contribute very little to contamination of the silicon by dissolving in the silicon. Third, they possess the property of stable slag formation with low melting point and low viscosity by reacting with the slag, which can make it easy to handle them with respect to exhaust and waste treatment. More preferably, the oxidizing agent is a material comprising as a primary component at least one of the following: sodium carbonate, potassium carbonate, sodium hydrogen carbonate, potassium hydrogen carbonate, magnesium carbonate, calcium carbonate, hydrates of each of the above carbonates, magnesium hydrate or calcium hydrate. There are several reasons why these materials are more preferred. First, these materials have the ability to form a $SiO_2$ film on the surface of the molten silicon, which inhibits contact between the molten silicon and the slag, and these materials form slag and are removed with the slag. Second, these materials are mass-produced goods and high purity products are surely obtained. Third, particularly with sodium carbonate or sodium hydroxide, the boron in the slag can be changed to a low boiling point material. This low boiling point material includes compounds comprising boron and oxygen and/or boron, oxygen and sodium and is characterized by being easily vaporized and removed from the slag. The present inventors are the first to discover the phenomenon of formation of a "low boiling point material" and the removal by vaporization from the slag. The alkaline-earth metals mentioned above include beryllium and magnesium.

Slag: As for slag, $SiO_2$, such as high purity silica sand, with a low possibility of contaminating silicon, or $Al_2O_3$, such as high purity alumina, may be used as base materials. As described below, since it is preferable to operate the purification at a temperature that is close to the melting point of silicon, it is also desirable to lower the melting point and the viscosity of the slag by adding additives to the raw slag material. An example of such additives includes an oxidizing agent, such as sodium carbonate, which is capable of removing boron by vaporization by changing boron to a low boiling point compound, thus, providing the slag with high functionality. It is also possible to add additives other than oxidizing agents. Such additives include CaO, to achieve a milder reaction rate for purification. Regardless, it is unavoidable that a part of the oxidizing agent will react with the slag and some components of the oxidizing agent will migrate into the slag. As for the slag, commercially available high purity soda glass can be used after being crushed and heated. As for the temperature of the slag, it should preferably be 2000° C. or less in view of the desire to prevent silicon contamination and/or an excessive reaction rate.

Slag, oxidizing agent feeding operation: Raw slag material, in the form of a molten material, a softened glass state or a granular solid prepared by crushing solidified raw material, may be fed onto the molten silicon so as to spread out uniformly thereon. The grain size of the granular solid preferably ranges from 1 mm to 200 mm in view of anti-scattering and/or workability, although a smaller grain size is advantageous to form molten slag quickly. However, extremely small sized grains can easily scatter inside the furnace, which causes problems with respect to workability.

As for the oxidizing agent, soda ash or the like, a commercially available granular material, can be used without problems. As for the grain size, it preferably ranges from 1 mm to 50 mm in view of reactivity and feeding workability. If a strong reaction can be allowed, it is possible to increase the reaction rate by feeding molten oxidizing agent directly on the molten silicon after heating the oxidizing agent in advance to a temperature slightly higher than the melting point. It should be noted, however, that the oxidizing agent are preferably be fed at a temperature under its decomposing temperature since a majority of alkali carbonates are decomposed/vaporized at a temperature of more than 1000° C.

Figure 4A:
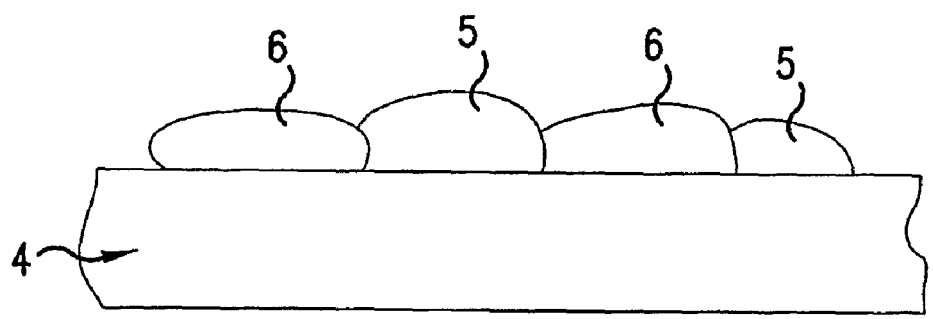
FIG. 4a is an explanatory diagram providing one illustration of a mixture of slag and oxidizing agent over molten silicon.
Figure 4B:
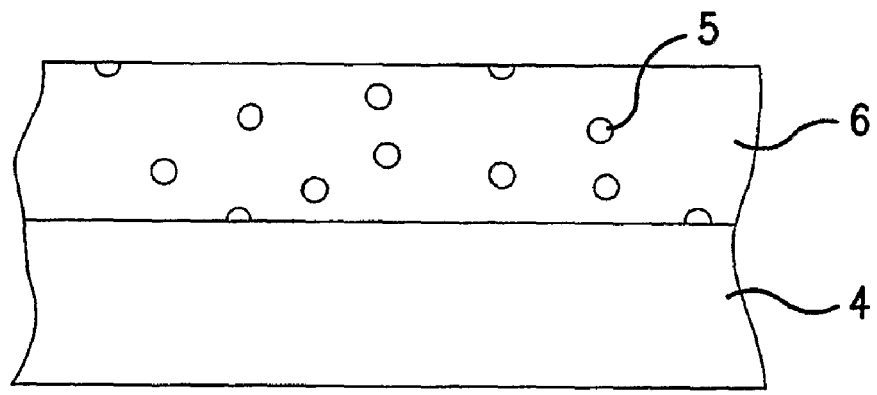
FIG. 4b is an explanatory diagram providing another illustration of a mixture of slag and oxidizing agent over molten silicon.
Figure 4C:
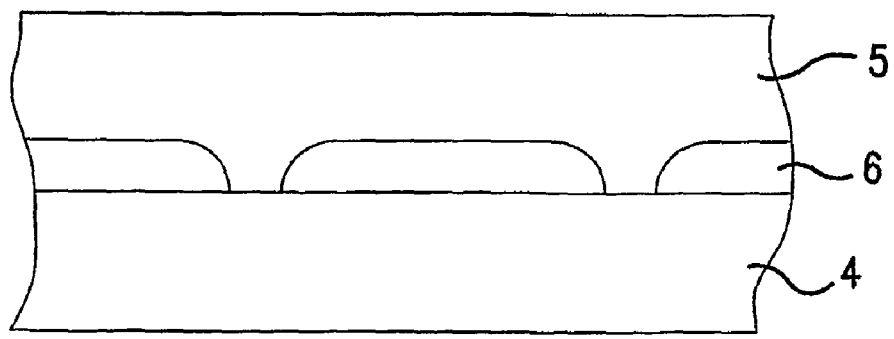
FIG. 4c is an explanatory diagram providing an illustration of oxidizing agent placed on slag over molten silicon.

As for the positional relation between the fed slag and the fed oxidizing agent on the molten silicon, it is preferable to place the oxidizing agent directly on the molten silicon. Since the boron in the molten silicon can be mainly oxidized by direct contact with the oxidizing agent, the contact area between the molten silicon and the oxidizing agent is preferably as large as possible. Enlarging the contact area by stirring the molten silicon can increase the boron oxidization rate. It has been found by the present inventors that boron in the molten silicon is mainly oxidized by direct contact with the oxidizing agent and then immediately absorbed in the slag as boron oxide. This provides a high partition rate of boron. If lowering of the reaction rate is needed because the reaction rate is too fast for the operation, it is not necessary to place the oxidizing agent under the slag. Rather, the oxidizing agent may be fed so as to be mixed with the slag (as shown in FIG. 4a and FIG. 4b) or placed on the slag (as shown in FIG. 4c).

The slag and oxidizing agent being fed together means that the slag and oxidizing agent fed within a short time interval. Feeding within a short time interval means, for example, that the slag is fed before a majority of the oxidizing agent is consumed (due to reaction with the molten silicon and/or decomposition/vaporization under high temperature). More specifically, for example, there is no problem if the feeding of the slag starts within 20 minutes after the oxidizing agent of tens of kg is initially fed.

Figure 3:
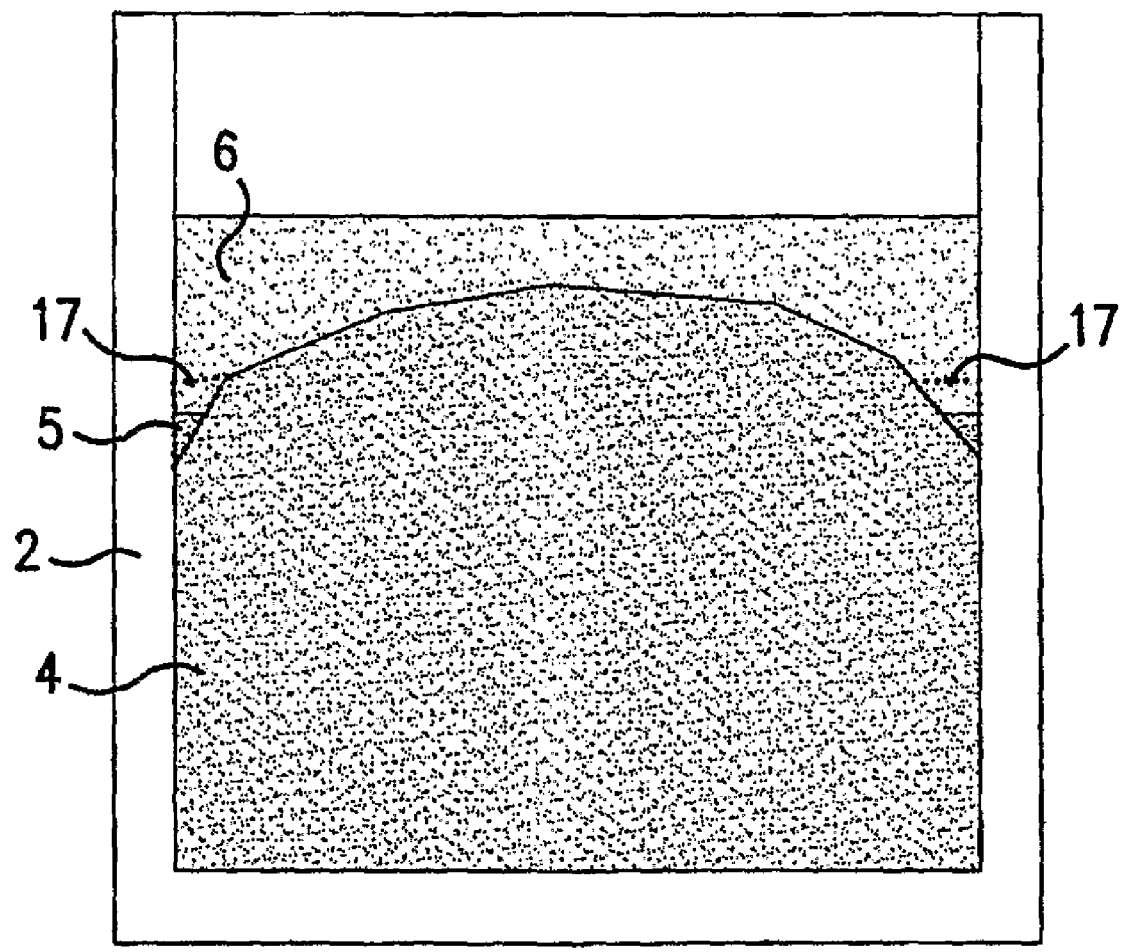
FIG. 3 is an explanatory diagram showing shape of the interface between the molten silicon and slag accommodated in a crucible.

It is very difficult to prevent a small amount of purified silicon from being present in the used material. The reason for this is explained using FIG. 3. In the process of slag purification, the interface between the molten silicon 4 and the slag 6 (and oxidizing agent 5) is along a greatly curved plane. This forms a wedge-shaped space 17 between the interface and the wall of crucible 2. Slag staying in that wedge-shaped space is hardly discharged because the boundary tension of the silicon is large and the density difference between the silicon and the slag is small. This is a unique problem encountered during slag purification of silicon and different from that encountered during slag purification of steel where the corresponding interface is hardly curved due to different properties of steel. If the slag within the wedge-spaced shape, which is barely discharged, remains in the purified silicon, the remaining slag will be a source of contamination in the next purification stage. Therefore, the slag within the wedge-space shape 17 is preferably removed completely and in practice, the removal thereof will include removal of the surrounding silicon. This reduces the amount of purified silicon remaining in the crucible 2. If the slag is simply discarded after being used once, the silicon removed from the crucible and discarded together with slag simply contributes to a lowering of the percentage yield, which leads to pushing up the cost. In the present invention, purification of silicon is performed repeatedly; therefore, lowering of the percentage yield can be a problem. Thus, in the present invention, the lowering of the percentage yield is avoided by repeatedly reusing the slag together with purified silicon. Since the slag to be reused is always fed to silicon of which purity is lower than that of previously purified silicon, the higher purity silicon included in the reused slag does not present a problem in terms of purity.

Other operation conditions: As for the crucible to be used, stability against molten silicon and oxidizing agents is desired. For example, graphite and/or alumina can be used. A crucible of which the primary material is $SiO_2$ can be used in order to take advantage of elution of crucible material as a part of raw material for the slag.

As for the operation temperature, a high temperature operation is preferably avoided as much as possible in view of durability and contamination of the refractory lining. The temperature of the molten silicon is preferably between the melting point of silicon and 2000° C. The temperature of the silicon obviously has to be at the temperature of the melting point of silicon or higher.

As for the operation atmosphere, a reducing atmosphere, such as hydrogen gas is preferably avoided so as not to inhibit the oxidization of boron in the molten silicon. In the case where graphite is used as the crucible and/or refractory lining, an oxidizing atmosphere, such as air is preferably avoided in order to avoid the deterioration of the crucible and/or refractory lining by oxidization. Therefore, an inert gas atmosphere, such as an argon gas atmosphere, is preferred. As for the ambient pressure, unless there is an extremely low pressure such as 100 Pa or less, there are no special limitations. In such a low pressure, the reaction between the molten silicon and $SiO_2$ in the slag generates a great amount of SiO gas, which can lead to a very low percentage yield of silicon.

EXAMPLES

Example 1

In Example 1, using a single purification furnace, a used slag, which was used in previous purification, is to be used repeatedly for purifying newly fed silicon. More specifically, a first purification is conducted by feeding silicon into the furnace and placing slag on the silicon. After completing the purification, the used slag is separated from the purified silicon and stored temporarily in a used slag receiver and the purified silicon is taken out of the furnace. Then, new silicon to be purified is fed into the furnace and the used slag stored temporarily is placed on the newly fed silicon so as to be used for the next purification. More specifically, a first silicon purification is carried out using a purification furnace as shown in FIG. 1 50 kg of silicon grains having a boron concentration of 0.4 mass ppm and an average diameter of 5 mm is accommodated in the graphite crucible having a diameter of 500 mm and placed in the purification furnace. The crucible is heated by resistance heating to 1500° C. in an argon atmosphere and molten silicon is maintained. In another heating furnace (not shown), a mixture of 35 kg of high purity silica sand having a boron concentration of 1.2 mass ppm and an average diameter of 10 mm, and 5 kg of powdered sodium carbonate ($Na_2CO_3$) having a boron concentration of 0.4 mass ppm are accommodated in a graphite crucible and heated to and maintained at 1600° C. to form a slag. Then, 15 kg of powdered sodium carbonate ($Na_2CO_3$) having a boron concentration of 0.4 mass ppm is fed onto the molten silicon in the purification furnace through an oxidizing agent feeding tube, and the slag prepared in the other heating furnace is transported together with the crucible to the top of purification furnace and the crucible is tilted to feed the slag onto the molten silicon through a slag feeding tube. The time from feeding the oxidizing agent to feeding the slag is about 5 minutes. After finishing the feeding of the slag, purification is carried out for 30 minutes keeping the molten silicon at 1500° C. under argon atmospheric pressure. After finishing the purification, the crucible is tilted to discharge the slag and remaining oxidizing agent into the used slag receiver and the molten silicon is sampled. The sampling is made as follows: One end of a high purity alumina tube, which is heated to a temperature greater than the melting point of silicon, is dipped into the molten silicon, and the molten silicon is sucked through the tube. Solidified silicon formed by quenching at a non-heated portion of the tube is carried out of the furnace and the solidified silicon is separated from the alumina tube as a sample to be analyzed. The weight of the sample is about 100 g. The method of component analysis of the sample is Inductively Coupled Plasma (ICP) analysis, a method that is widely used in the industry. The amount of the used material is about 50 kg. The used slag receiver is moved out of the furnace and 100 g of the used material is sampled using a crucible of high purity alumina with a long handle and the sample is solidified. The method of component analysis of the used material sample is ICP analysis. As a result of the analysis, the boron concentration of the silicon is 0.16 mass ppm and the boron concentration of the used material is 1.26 mass ppm. The composition of the used material is 2 mass % of simple oxidizing agent, 4 mass % of silicon and the remainder is slag. Thus, the purified silicon satisfies the boron concentration requirements of silicon intended for solar batteries.

A second silicon purification is carried out using the methods and materials, as the first purification above except the slag used in the second purification is the used slag coming from the slag used in the first purification above. Actually, the used slag is prepared by crushing the solidified used material from the first purification process to an average size of 50 mm diameter. The results of analysis of the samples from the second purification are as follows: the boron concentration of the silicon is 0.18 mass ppm, and the boron concentration of the used material is 1.4 mass ppm. That is, the silicon purified using the used slag can meet the boron concentration requirements of silicon intended for solar batteries. The percentage yield of silicon is 98 mass % and the total slag formation is 50 kg after the above two purification processes.

Comparative Example 1

Silicon purification is carried out twice independently in the same way as that for the first purification described Example 1. As a result, the total percentage yield of silicon is 96 mass % and the total slag formation is 100 kg for the two purification processes. In view of this, it is found that the percentage yield and the amount of slag formation/used amount of raw slag material can be greatly improved.

Example 2

In Example 2, using a plurality of purification furnaces, a used slag, which was used in purification in one furnace, is to be used repeatedly for purifying silicon in other furnaces. More specifically, in an exemplary case of using three furnaces, silicon to be purified is fed into the first furnace and slag is placed on the silicon in the first furnace to commence purification. After that, other silicon to be purified is fed into the second furnace and the slag used in the first furnace is now placed on the silicon fed into the second furnace to commence purification. This second used slag is further used for purification of silicon fed in the third furnace. In each furnace, the same silicon is purified repeatedly using different slag each time the purification is performed. More specifically, three purification furnaces, each of which is the same as the purification furnace used in the first purification of Example 1, are prepared. These three furnaces are called No. 1 furnace, No. 2 furnace and No. 3 furnace, respectively. The purification method used in each furnace is the same as that used in Example 1 except for the raw material (silicon to be purified) to be used. Silicon purification is repeatedly carried out in each furnace (the same silicon is purified repeatedly). The experiment is arranged so that the purity of silicon to be purified in each furnace can be different from the other furnaces. That is, the highest purity silicon is purified in the No. 1 furnace and the lowest purity silicon is purified in the No. 3 furnace. More specifically, when a third purification is carried out in the No. 1 furnace, a second purification is carried out in the No. 2 furnace and a first purification is carried out in the No. 3 furnace. Used material formed by purification in the No. 1 furnace is fed in a fluid state to the crucible in the No. 2 furnace as a slag to be used in the No. 2 furnace. Then, used material formed by purification in the No. 2 furnace is fed in a fluid state to the crucible in the No. 3 furnace as a slag to be used in the No. 3 furnace in turn. Used material formed by purification in the No. 3 furnace is discarded. As for the slag to be fed in the No. 1 furnace, fresh slag is always used. As for the raw material (silicon to be purified) to be used in each furnace, 50 kg of metal silicon grains having a boron concentration of 12 mass ppm and an average diameter of 5 mm is used. As for the oxidizing agent, 15 kg of powdered sodium carbonate ($Na_2CO_3$) having a boron concentration of 0.4 mass ppm is used. As for the slag to be fed in the No. 1 furnace, a slag formed in advance using a mixture of 35 kg of high purity silica sand having a boron concentration of 1.2 mass ppm and an average diameter of 10 mm, and 5 kg of powdered sodium carbonate ($Na_2CO_3$) having boron concentration of 0.4 mass ppm is used. When there is no used slag available for the No. 2 furnace and the No. 3 furnace, a fresh slag is used. After several purifications, seven times in the No. 1 furnace, seven times in the No. 2 furnace and eight times in the No. 3 furnace, the results finally obtained are as follows: the boron concentration of silicon is 0.09 mass ppm with the No. 1 furnace, 0.10 mass ppm with the No. 2 furnace and 0.08 mass ppm with the No. 3 furnace. Each of the above results show that the boron concentration of each obtained silicon sample satisfy the boron concentration requirements of silicon intended for solar batteries. Including all three furnaces, the total percentage yield of silicon is 98 mass % and the total slag formation is 400 kg.

Comparative Example 2

Silicon purification is carried out using the same methods and materials as the first purification in Example 1 above, except for the nature of the raw material (silicon to be purified). In this comparative Example 2, silicon purification is repeated seven times without replacing the silicon. Then, the silicon is replaced with fresh silicon for another seven rounds of purification. After that, a further silicon replacement is made for an additional seven rounds of purification. A total of 21 rounds of purification operation are conducted. The raw material to be used (silicon to be purified) is 50 kg of metal silicon grains having a boron concentration of 12 mass ppm and an average diameter of 5 mm. The oxidizing agent to be used is 15 kg of powdered sodium carbonate ($Na_2CO_3$) having a boron concentration of 0.4 mass ppm. As for the slag to be used, a slag formed in advance using a mixture of 35 kg of high purity silica sand having a boron concentration of 1.2 mass ppm and an average diameter of 10 mm, and 5 kg of powdered sodium carbonate ($Na_2CO_3$) having a boron concentration of 0.4 mass ppm is used. As a result, the boron concentration of the silicon is 0.09 mass ppm, which meets the requirement of silicon intended for a solar battery. The total percentage yield of silicon is 75 mass % and the total slag formation is 1050 kg. In view of this, it is found that the percentage yield and amount of slag formation/used amount of raw slag material can be much improved.

Comparative Example 3

A molten slag is prepared by heating a mixture of 20 kg of $SiO_2$ and 20 kg of CaO in a furnace (not shown). The boron concentration of the slag is 0.5 mass ppm. Purification in the same manner as in Example 2 is carried out using the slag prepared above and a first, second and third furnace. However, an oxidizing agent is not added to the used slag when the slag is reused. Each furnace accommodates 50 kg of molten silicon having an initial boron concentration of 10 mass ppm. Separation of the used slag from the molten silicon is carefully performed taking 30 minutes each time the separation is made so as not to include silicon in the separated slag. The amount of slag remaining on the silicon averages 1.5 mass % of the total slag mass. The slag above has a low partition rate of boron of about 1, and is stable during the purification and the amount remaining on the silicon is relatively small. Therefore, any influence caused by the remaining slag on the next purification is as small as lowering boron reduction in the silicon by 2 mass % compared to the case where there is no remaining slag at all. A total of 40 slag purifications are made using total 1200 kg of slag per furnace. In each furnace, 35 kg of silicon having a boron concentration of 1.0 mass ppm is obtained. Silicon which satisfies the boron concentration requirements of silicon intended for solar batteries can be obtained by using the silicon obtained in the above process as a raw material in a subsequent purification, for example, using it as a raw material in a subsequent conventional oxygen-hydrogen torch purification method. As shown in Example 3, even if an oxidizing agent is not added to the used slag when reused, the obtained silicon can be used as a raw material with a lowered boron concentration for another purification process. This makes it possible to significantly reduce the time for purification and make the manufacturing facility compact.

All cited patents, publications, copending applications, and provisional applications referred to in this application are herein incorporated by reference.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for producing high purity silicon by migrating impurities in silicon to slag comprising:
   performing a first purification of a first silicon to obtain a first purified silicon and a used slag;
   separating the used slag from the first purified silicon after finishing the first purification; and
   feeding the separated used slag and an oxidizing agent comprising as a primary component at least one material selected from the group consisting of sodium carbonate, potassium carbonate, sodium hydrogen carbonate, potassium hydrogen carbonate, magnesium carbonate, calcium carbonate, hydrates of each the above carbonates, magnesium hydrate and calcium hydrate, to a second molten silicon in a second purification of a second silicon,
   wherein the purity of said second silicon prior to the second purification is lower than the purity of the first purified silicon, and the feeding of the oxidizing agent is conducted so that the oxidizing agent directly covers the upper surface of the molten silicon.

2. The method according to claim 1, wherein the slag separation is conducted so that the separated slag includes a part of the first purified silicon.

3. The method according to claim 1, wherein a partition rate or boron in the range of 7 to 11 is obtained.

* * * * *